United States Patent
Levionnais et al.

(10) Patent No.: US 9,491,273 B2
(45) Date of Patent: Nov. 8, 2016

(54) SHELL FOR MOBILE TELEPHONE WITH NFC FUNCTIONALITY

(75) Inventors: Philippe Levionnais, Caen (FR); David Picquenot, Authie (FR)

(73) Assignee: Orange, Paris (FR)

( * ) Notice: Subject to any disclaimer, the term of this patent is extended or adjusted under 35 U.S.C. 154(b) by 38 days.

(21) Appl. No.: 13/699,909

(22) PCT Filed: May 23, 2011

(86) PCT No.: PCT/FR2011/051161
§ 371 (c)(1),
(2), (4) Date: Nov. 26, 2012

(87) PCT Pub. No.: WO2011/148087
PCT Pub. Date: Dec. 1, 2011

(65) Prior Publication Data
US 2013/0072258 A1    Mar. 21, 2013

(30) Foreign Application Priority Data
May 27, 2010 (FR) ...................................... 10 54117

(51) Int. Cl.
*H04B 5/00* (2006.01)
*H04M 1/04* (2006.01)
(Continued)

(52) U.S. Cl.
CPC ............. *H04M 1/04* (2013.01); *H04B 1/3833* (2013.01); *H04B 5/00* (2013.01); *H04M 1/72527* (2013.01); *H04M 1/7253* (2013.01); *H04M 2250/04* (2013.01)

(58) Field of Classification Search
CPC .... H04B 1/3816; H04B 5/00; H04B 5/0031; H04M 2250/14; H04M 1/72575; Y02B 60/50; G06K 19/0723; G06K 19/07; G06K 7/10237; G06K 7/10297; G07F 7/0893; H04W 4/008; H04W 88/06; G06F 1/1626; G06F 1/182; G06Q 20/327; G06Q 20/3278; H04L 63/0492; H04L 63/0853
USPC ......................................................... 455/558
See application file for complete search history.

(56) References Cited

U.S. PATENT DOCUMENTS 5,101,081 A * 3/1992 Drumm .......................... 345/174
7,975,921 B2 * 7/2011 Mani ..................... G06K 7/0008
235/441

(Continued)

FOREIGN PATENT DOCUMENTS

CN        1751326 A      3/2006
EP        2 175 565 A1   4/2010
(Continued)

OTHER PUBLICATIONS

English Translation of Office Action issued for CN 201180037437.7 (Sep. 25, 2014).

*Primary Examiner* — Matthew Sams
(74) *Attorney, Agent, or Firm* — Drinker Biddle & Reath LLP (57) ABSTRACT

A shell for a mobile telephone able to comprise a subscriber identity card. The mobile telephone has, on the one hand, a front face exhibiting a user interface and, on the other hand, a rear face. The shell has an internal surface and an external surface. This shell has a suitable shape adapted for removably receiving the mobile telephone so that the rear face of the mobile telephone is held along the internal surface of the shell. The internal surface comprises: a first means adapted for holding a near-field communication device and an antenna associated therewith; and a second means adapted for guiding at least a portion of a wire-based interface intended to link the near-field communication device to the subscriber identity card.

14 Claims, 6 Drawing Sheets

(51) Int. Cl.
*H04B 1/3827* (2015.01)
*H04M 1/725* (2006.01)

(56) References Cited

U.S. PATENT DOCUMENTS

| | | | | |
|---|---|---|---|---|
| 8,135,782 | B2* | 3/2012 | Kitani | G06F 1/3209 709/206 |
| 8,351,857 | B2* | 1/2013 | Miura | G06Q 20/327 235/380 |
| 8,583,179 | B2* | 11/2013 | Rizzo | G06K 7/0008 455/41.1 |
| 8,670,801 | B2* | 3/2014 | Levionnais | G06K 7/0008 455/41.1 |
| 8,711,718 | B2* | 4/2014 | Su | H04W 52/0229 370/252 |
| 8,761,667 | B2* | 6/2014 | Levionnais | G06K 7/10237 455/41.1 |
| 9,026,459 | B2* | 5/2015 | Fisher | G06Q 20/20 235/380 |
| 9,038,916 | B2* | 5/2015 | Al-Kadi | G06K 19/07 235/492 |
| 9,088,066 | B2* | 7/2015 | Levionnais | G06K 19/07773 |
| 2002/0041175 | A1 | 4/2002 | Lauper et al. | |
| 2003/0097350 | A1* | 5/2003 | ShamRao | 707/1 |
| 2003/0195020 | A1* | 10/2003 | Kubo | 455/575.1 |
| 2004/0106440 | A1* | 6/2004 | Haruyama | 455/566 |
| 2005/0130593 | A1* | 6/2005 | Michalak | G08B 21/24 455/66.1 |
| 2005/0174727 | A1* | 8/2005 | Thomas | G06F 1/1626 361/679.56 |
| 2007/0026893 | A1* | 2/2007 | Sakamoto et al. | 455/558 |
| 2008/0254761 | A1* | 10/2008 | Troemel | H04B 1/08 455/344 |
| 2010/0093412 | A1* | 4/2010 | Serra | H04B 1/3888 455/575.8 |
| 2010/0159829 | A1* | 6/2010 | McCormack | 455/41.1 |
| 2010/0293613 | A1* | 11/2010 | Hum | G06Q 20/32 726/20 |
| 2012/0135682 | A1* | 5/2012 | Levionnais | G06K 7/10237 455/41.1 |
| 2013/0072255 | A1* | 3/2013 | Levionnais | G06K 7/0008 455/552.1 |
| 2015/0333790 | A1* | 11/2015 | Magliulo | H04B 1/3888 455/575.8 |

FOREIGN PATENT DOCUMENTS

| | | |
|---|---|---|
| KR | 2008-0113185 A | 12/2008 |
| WO | WO 00/79771 A1 | 12/2000 |
| WO | WO 03/067539 A1 | 8/2003 |

\* cited by examiner

SHELL FOR MOBILE TELEPHONE WITH NFC FUNCTIONALITY

CROSS-REFERENCE TO RELATED APPLICATIONS

This application is the U.S. national phase of the International Patent Application No. PCT/FR2011/051161 filed May 23, 2011, which claims the benefit of French Application No. 1054117 filed May 27, 2010, the entire content of which is incorporated herein by reference.

FIELD

The invention relates to the field of contactless technology, and more particularly the field of using such a technology in mobile communications terminals in order to execute contactless applications.

BACKGROUND

One example of an implementation of contactless applications is based on NFC technology (Near-field Communication). These contactless applications may concern, for example, electronic transactions in banking or in public transportation, or may serve as access control and identification applications. An NFC communication is established between two non-touching entities, or two NFC entities, one operating as a contactless card and the other as a contactless card reader. In another mode, called P2P mode (Peer to Peer), two NFC entities operating as contactless cards exchange data locally and therefore play an equivalent role.

Such an NFC entity consists of a near-field communication device, referred to as an NFC device below, and an associated antenna which allows it to establish contactless communication with another NFC entity. The NFC entity operating as a contactless card may correspond to an RFID (radio frequency identification) tag, for example. Depending on the application, an NFC entity operating as a card reader may correspond, for example, to an electronic payment terminal or a machine for validating public transport tickets, or a tag reader able to identify RFID tags.

The functionalities of such a contactless entity may be supplied by a mobile telephone terminal. In this case, the mobile telephone terminal contains a subscriber identity card, or SIM card (for Subscriber Identity Module), as well as an NFC device and its associated antenna.

In this context, contactless applications, which require a certain level of security, are usually installed in the SIM card or subscriber identity card of the mobile terminal. A communication can thus be established within the terminal between the contactless application of the subscriber identity card and the contactless device. Then the contactless device installed on the mobile terminal allows the mobile terminal, more specifically the application concerned, to communicate with another contactless entity in proximity to the terminal. These mobile telephones can then be used as contactless cards for example.

It is not easy to adapt an existing mobile telephone to render it capable of offering NFC functionalities, however.

SUMMARY

The invention provides such an adaptation of a mobile telephone to the NFC domain.

A first aspect of the invention proposes a shell for a mobile telephone which is able to comprise a subscriber identity card;
  said mobile telephone having a front face exhibiting a user interface, and a rear face; and the shell having an internal surface and an external surface;
  the shell having a shape adapted for removably receiving the mobile telephone so that the rear face of the mobile telephone is held along the internal surface of the shell;
  wherein the internal surface comprises:
    a first means adapted for holding a near-field communication device and an associated antenna; and
    a second means adapted for guiding at least a portion of a wire-based interface (31) intended to link the near-field communication device to the subscriber identity card.

The terms "NFC device" or "contactless device" are understood to mean an assembly comprising an NFC component, or contactless component, and other electronic components which are necessary to implement it in a circuit for use, such as capacitors or resistors for example.

Here, a mobile telephone is adapted for NFC applications by using a wire-based interface to connect the subscriber identity card to a near-field communication device. In this manner, using this adapting assembly comprising both a near-field communication device and a wire-based interface for connecting to the subscriber identity card, it is possible to adapt any mobile telephone to NFC applications.

However, it may prove to be difficult to integrate this adapting assembly into any mobile telephone.

With the characteristics of an embodiment of the invention, it is advantageously easy to integrate such an adapting assembly with any mobile telephone. A shell is provided that is adapted for removably receiving and guiding the adapting assembly and for attachment onto the rear face of the mobile telephone. In this manner, any type of mobile telephone can easily be enabled for NFC functionalities.

The phrase "removably receiving the mobile telephone" is understood to mean the fact that the shell is adapted to accept the mobile telephone concerned. For this purpose, the shell can have an internal surface of a size similar to that of the rear face of the mobile telephone, and edges that run along the sides of the mobile telephone.

This shell forms a housing for receiving the mobile telephone in the sense that it has a shape adapted to fit against the external contours of the mobile telephone on the back face and at least some of the external lateral edges of the telephone.

The phrase "so that the rear face of the mobile telephone is held along the internal surface of the shell" is understood to mean the fact that the telephone can be non-permanently attached inside the shell. The invention places no limitation on this aspect. In particular, there may be mechanical catches for removably anchoring the telephone in the housing formed by the shell which therefore comprises a flat face fitting against the contours of the rear face of the mobile telephone and edges running along certain sides of the telephone.

Advantageously, the shell is not only adapted to receive the mobile telephone, but it additionally holds inside itself both the NFC device and the wire-based interface which connects it to the subscriber identity card.

More specifically, the internal surface of the shell comprises a first means adapted to hold the NFC device and its antenna. It also comprises a second means adapted to guide at least a portion of the wire-based interface.

When the telephone is housed in the shell according to an embodiment of the invention, not only is the back face of the telephone protected by the shell, but in addition the NFC device, its antenna, and the wire-based interface, which are respectively held and guided on the inner face of the shell, are also protected from outside damage such as impacts for example. In this manner a mobile telephone can be adapted for implementing NFC applications, while protecting it and providing protection for the adapting assembly.

In fact, it is sufficient to allow the wire-based interface to be run from the subscriber identity card of the telephone to an NFC device located outside the telephone. In this case, it is then sufficient to run the wire-based interface along a side edge of the telephone to the location where the wire-based interface enters the mobile telephone in order to connect the NFC device held on the internal surface of the shell.

In certain models of mobile telephones, the SIM card can be accessed relatively easily at more or less the mid-point between the rear face and front face of the telephone, from one of its sides. It is possible for the shell to have a lateral edge intended to cover the side of the mobile telephone in the area where the SIM card is accessible.

Under these conditions, the entire NFC adapting assembly, meaning the NFC device and its antenna and the wire-based interface, is protected by the shell. In addition, the NFC adapting assembly is not visible to a user of the telephone. It is thus possible to convert a mobile telephone into NFC equipment without this conversion being truly visible externally.

No limitation is placed on the manner used for holding the near-field communication device in place on the internal surface of the shell nor on the location where it is decided to place the near-field communication device. In fact, this location of the NFC device on the surface can be determined based on a length of the wire-based interface which is optimal for the device used and its antenna, and the contours of the mobile telephone, as well as the location where the wire-based interface passes inside the mobile telephone, for example.

It is possible to have the first means for holding the NFC device and its antenna in place, and the second means for guiding the wire-based interface, correspond to any mechanical means suitable for their role. These first and second means may be associated with providing a slight space between the rear face of the terminal and the internal surface of the shell when the telephone is housed in the shell according to an embodiment of the invention. Thus the device, its antenna, and the wire-based interface can also be held in place by the pressure between the rear face of the telephone and the inner face of the shell.

In one embodiment of the invention, the near-field communication device and the antenna are designed on a substrate; and
   the first means corresponds to a recess in the thickness of the shell on the internal surface, said recess being of a size suitable for receiving the substrate and holding it in place by the act of being recessed.

Here, the substrate receiving the NFC device and antenna is held in a fixed position on the internal surface of the shell in a previously made recess in the internal surface of the shell. The substrate can then be received in the shell recess provided for this purpose. In this manner it is advantageously possible to have complete prior control of the position of the NFC device and its antenna. Certain performance aspects related to the length of the wire-based interface can then be optimized beforehand.

It can be arranged so that this recess is of a depth such that, when the substrate is in place in the recess, the surface of the substrate containing the near-field communication device is level with the internal surface of the shell.

In this manner, the first means for holding the device and its antenna is both effective and easy to put in place. Once embedded in the recess, the substrate advantageously can no longer move even if the terminal is subjected to abrupt movements. In addition, it advantageously allows the substrate to be easily removable.

No limitation is placed on the second means contained in the internal surface of the shell.

It may also be arranged so that the first means of the shell according to an embodiment makes use of resin to hold the near-field communication device and associated antenna in place. Thus the card can be embedded in resin that ultimately forms part of the shell.

Not only do such advantageous characteristics allow holding the NFC device and its antenna in place within the shell, but they also provide protection for the NFC device.

In one embodiment of the invention, the wire-based interface corresponds to a plastic ribbon holding a plurality of wires within it and having a ribbon width and length; and the second means corresponds to a recess in the thickness of the shell on the internal surface, said recess being of a size appropriate for receiving the width of the wire ribbon and at least a portion of the length of the wire ribbon.

The wire-based interface is therefore in the form of a wire ribbon and offers the advantage of a relatively low thickness. It is therefore easier to accommodate the wire-based interface under these conditions.

In this embodiment, the internal surface of the shell then comprises, as the second means, a recess adapted to accept the width of the wire ribbon and part of its length.

Advantageously, the wire ribbon can thus easily be held in a previously determined position which allows optimizing certain performance aspects based on exchanges between the subscriber identity card and NFC device. In addition, such a recess for guiding a portion of the wire ribbon prevents the ribbon from shifting during use of the mobile telephone, as such movement could cause undesirable interference. This recess is of a width appropriate for accepting the width of the wire ribbon in order to hold it in place. The length of this recess can be adapted to accept a portion of the wire ribbon so that the other part runs along an edge of the mobile telephone in order to enter the telephone and connect to the subscriber identity card.

This recess for the wire ribbon is of a depth such that, when the wire ribbon is in place in the recess, the wire ribbon is flush with the internal surface of the shell.

By proceeding in this manner, the upper surface of the wire ribbon, meaning the surface opposite the surface of the ribbon which is placed against the internal surface of the shell, is substantially level with the internal surface of the shell outside the recess.

This characteristic guarantees that the wire ribbon is held in place.

In one embodiment of the invention, the shape of the shell presents a curved edge in the area where the wire-based interface enters the mobile telephone.

Such a characteristic advantageously allows protecting the wire-based interface where it enters the mobile telephone for connection to the SIM card.

A second aspect of the invention proposes a mobile terminal comprising a mobile telephone having a subscriber identity card, and a shell, said mobile telephone having a front face exhibiting a user interface, and a rear face; and the shell having an internal surface and an external surface;

said shell having a shape adapted for removably receiving the mobile telephone so that the rear face of the mobile telephone is held along the internal surface of the shell;

the internal surface comprising:

a first means adapted for holding a near-field communication device and an associated antenna; and a second means adapted for guiding at least a portion of a wire-based interface intended to link the near-field communication device to the subscriber identity card.

Such a terminal allows using the features of mobile telephony as well as NFC functionalities, from a mobile telephone allowing a wire-based interface to run from the subscriber identity card to outside the mobile telephone. To achieve this, it is sufficient to attach a shell adapted to provide the NFC device and its antenna as well as the corresponding wire-based interface.

Such a terminal is advantageously protected against impacts because of this shell, as well as having NFC functionalities which are also protected even if the mobile telephone was not originally designed to accommodate them.

The terminal can comprise any shell according to the first aspect of the invention.

A third aspect of the invention proposes a mobile communication system comprising a plurality of mobile terminals according to the second aspect of the invention.

Other features, goals, and advantages of the invention will be apparent from reading the following description of one of its embodiments.

BRIEF DESCRIPTION OF THE DRAWINGS

The invention will also be better understood by referring to the drawings, in which.

DETAILED DESCRIPTION

Figure 1:
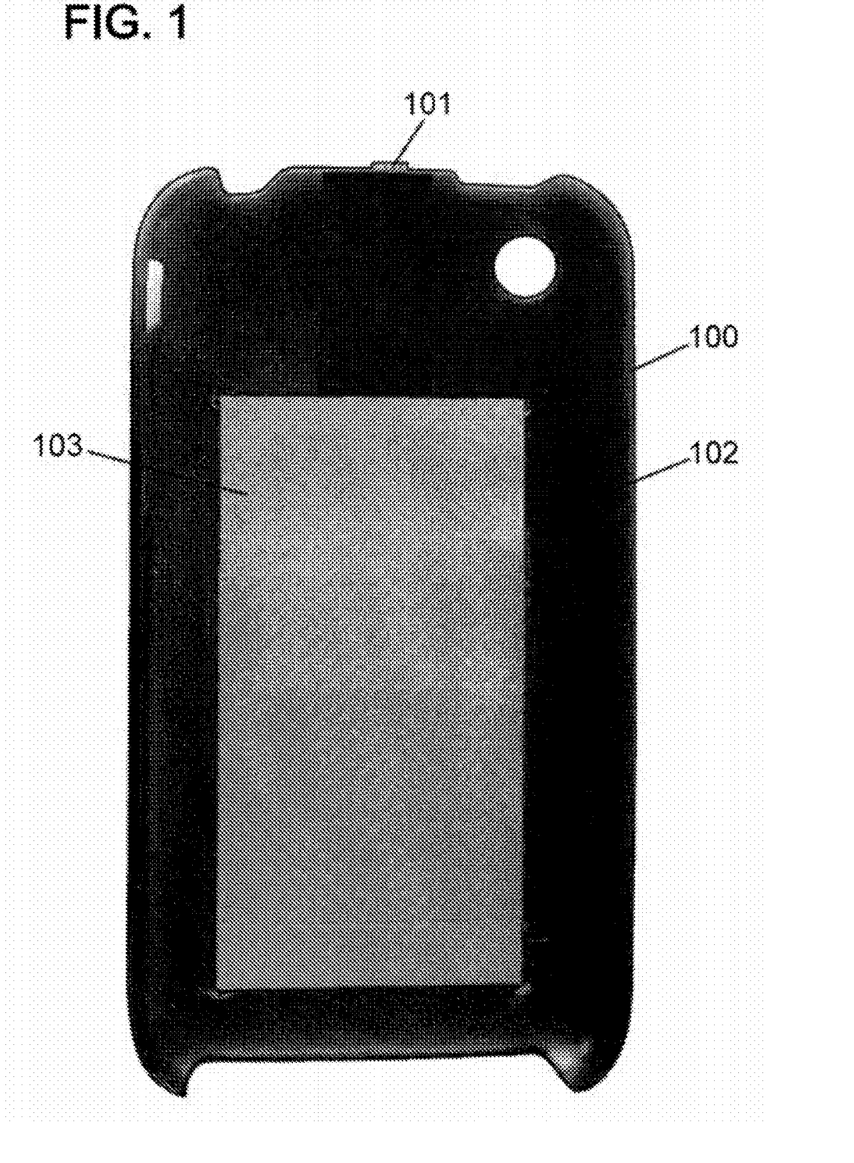
FIG. 1 illustrates a shell for a mobile telephone according to an embodiment of the invention.

FIG. 1 illustrates a shell for a mobile telephone according to an embodiment of the invention.

A shell 100 according to the invention is adapted for a mobile telephone able to comprise a subscriber identity card, or SIM card (Subscriber Identity Module). The shell 100 has an internal surface 102 as illustrated in FIG. 1 and an external surface which is the opposite surface and is therefore not illustrated. This external surface of the shell can be of any form. In an embodiment of the invention, it has a smooth and flat surface for the surface area intended to cover the rear face of the mobile telephone concerned, and a partially curved surface at the edges in order to fit against the lateral edges of the mobile terminal.

Also illustrated are a first means 103 adapted to hold in place an NFC device and its associated antenna, as well as a second means 101 adapted to guide a portion of a wire-based interface intended to connect the NFC device to the SIM card of the mobile telephone.

The first means 103 illustrated here corresponds to a recess in the thickness of the shell 100, adapted to house at least partially both the NFC device and its associated antenna. Any other means of holding in place the NFC device and its antenna can be used, for example such as glue, a mechanical attachment, etc.

In one embodiment, the NFC device and its antenna are designed on a substrate and the first means 103 is adapted to the size of the substrate.

The second means 101 illustrated here corresponds to a recess in the thickness of the internal surface of the shell 100, which allows housing the wire-based interface. No limitation is placed on this second means, however. For example, the wire-based interface can be guided along the internal surface by mechanical attachments.

This shell has a shape adapted for removably receiving the mobile telephone so that the rear face of the mobile telephone is held in place along the internal surface of the shell.

In this example, a mobile telephone is adapted for NFC applications by using a wire-based interface to connect the subscriber identity card to a near-field communication device. In this manner, by means of an adapting assembly comprising both a near-field communication device and a wire-based interface for connecting it to the subscriber identity card, it is possible to adapt any mobile telephone to NFC applications.

Figure 2:
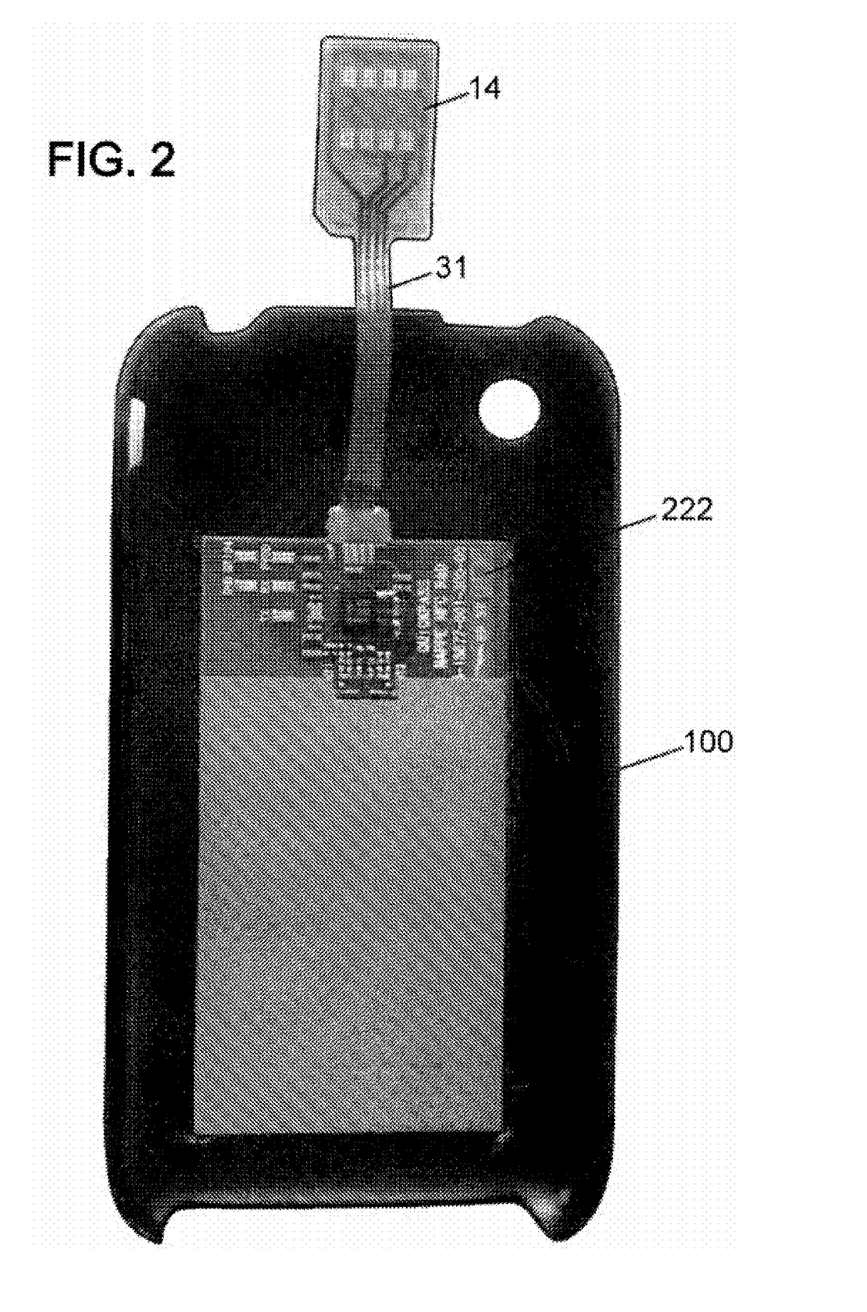
FIG. 2 illustrates a shell according to an embodiment of the invention in which an NFC adapting assembly is placed according to an embodiment of the invention.

FIG. 2 illustrates a shell according to an embodiment of the invention, in which an NFC adapting assembly according to an embodiment of the invention has been placed.

This shell 100 here is represented with an NFC adapting assembly placed inside it according to an embodiment of the invention.

The adapting assembly consists of a wire-based interface 31 suitable for connection to a SIM card 14. This wire-based interface corresponds, for illustrative purposes, to a wire ribbon 31 which is guided by the second means 101 of the shell 100, meaning in this example by a recess in the thickness of the shell. In addition, the NFC adapting assembly comprises an NFC device and its antenna, which for illustrative purposes are designed on a substrate 222 in this example. This substrate is held in place by the first means 103. Said first means corresponds here to a recess in the thickness of the shell intended to receive the substrate.

Figure 3:
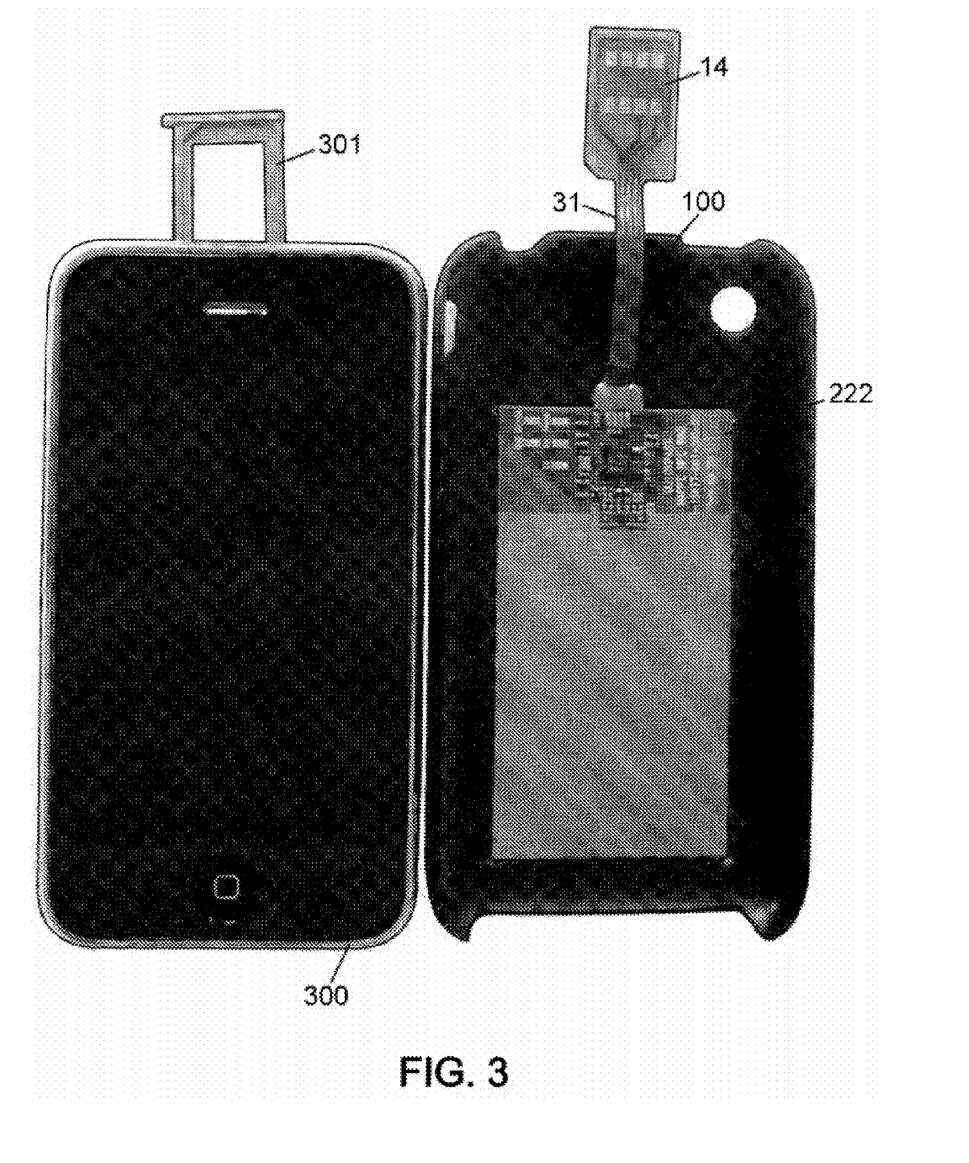
FIG. 3 illustrates both a shell and an NFC adapting assembly according to an embodiment of the invention, as well as a mobile telephone for which this shell is adapted according to an embodiment of the invention.

FIG. 3 illustrates both a shell and an NFC adapting assembly according to an embodiment of the invention, as well as a mobile telephone for which this shell is adapted according to an embodiment of the invention.

The shell 100 is adapted for receiving and housing a mobile telephone 300. This mobile telephone 300 has a drawer-like arrangement 301 for receiving the SIM card 14 before being pushed back inside the telephone.

Figure 4:
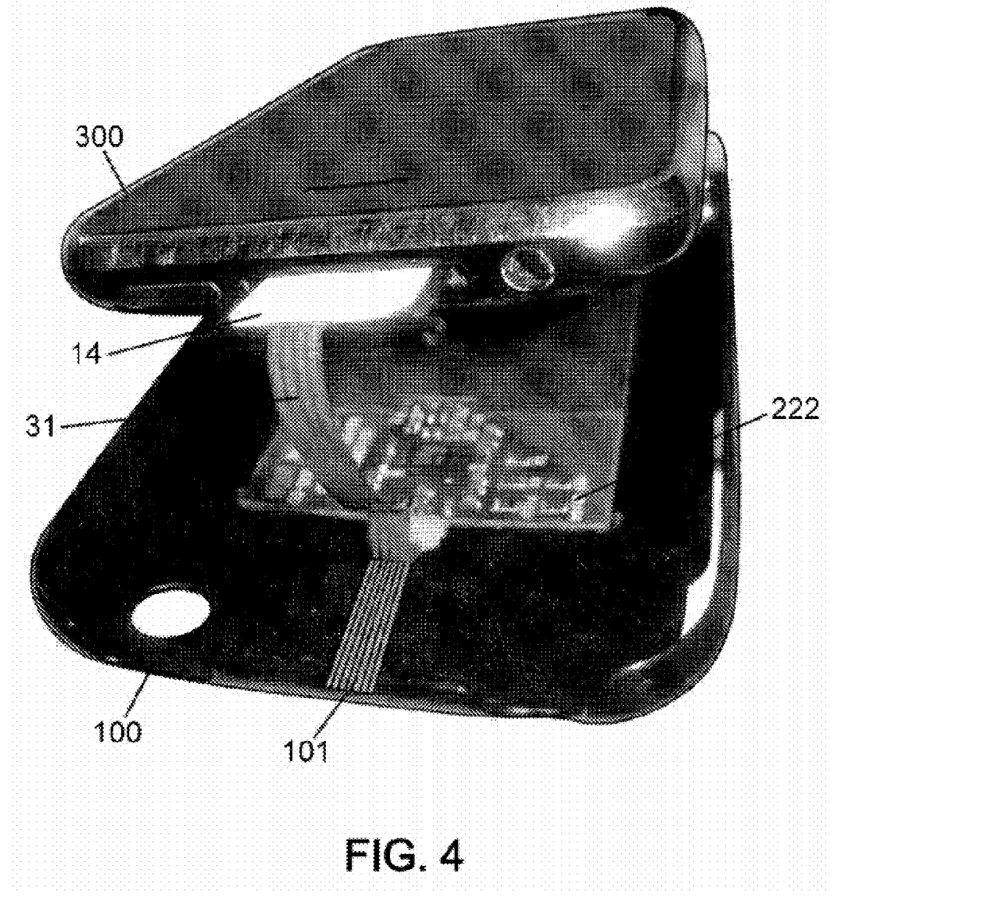
FIG. 4 illustrates an intermediate step of associating the mobile telephone with a shell according to an embodiment of the invention.

FIG. 4 illustrates an intermediate step in the association of the mobile telephone and a shell according to an embodiment of the invention.

The term "association" is understood to mean the fact that the telephone is housed in the shell 100 according to an embodiment. FIG. 4 represents the telephone 300 for which this shell 100 is adapted. The NFC device and its antenna are held in place on the inner face of the shell by the first means 103 (not represented in FIG. 4). The wire-based interface 31 is connected to the NFC device on one side and to the SIM card 14 at its other end. The SIM card 14 is housed in the drawer 301 of the mobile telephone 300 as illustrated in FIG. 3. The drawer holding the SIM card 14 can be pushed inside the mobile telephone. In this position, sufficient space remains between the drawer and the mobile telephone 300 to allow the wire-based interface to pass from inside the mobile telephone to outside the mobile telephone. One end of the wire-based interface is inside the telephone (connected to the SIM card), and the other end is outside the telephone and connected to the NFC device.

This FIG. 4 illustrates an intermediate step of positioning the mobile telephone 300 in the shell 100. Next the wire-based interface 31 is positioned in the second holding means 101 and the mobile telephone 300 is fixed in place, for example by snapping it into the shell, with its rear face against the internal surface of the shell 100.

Figure 5:
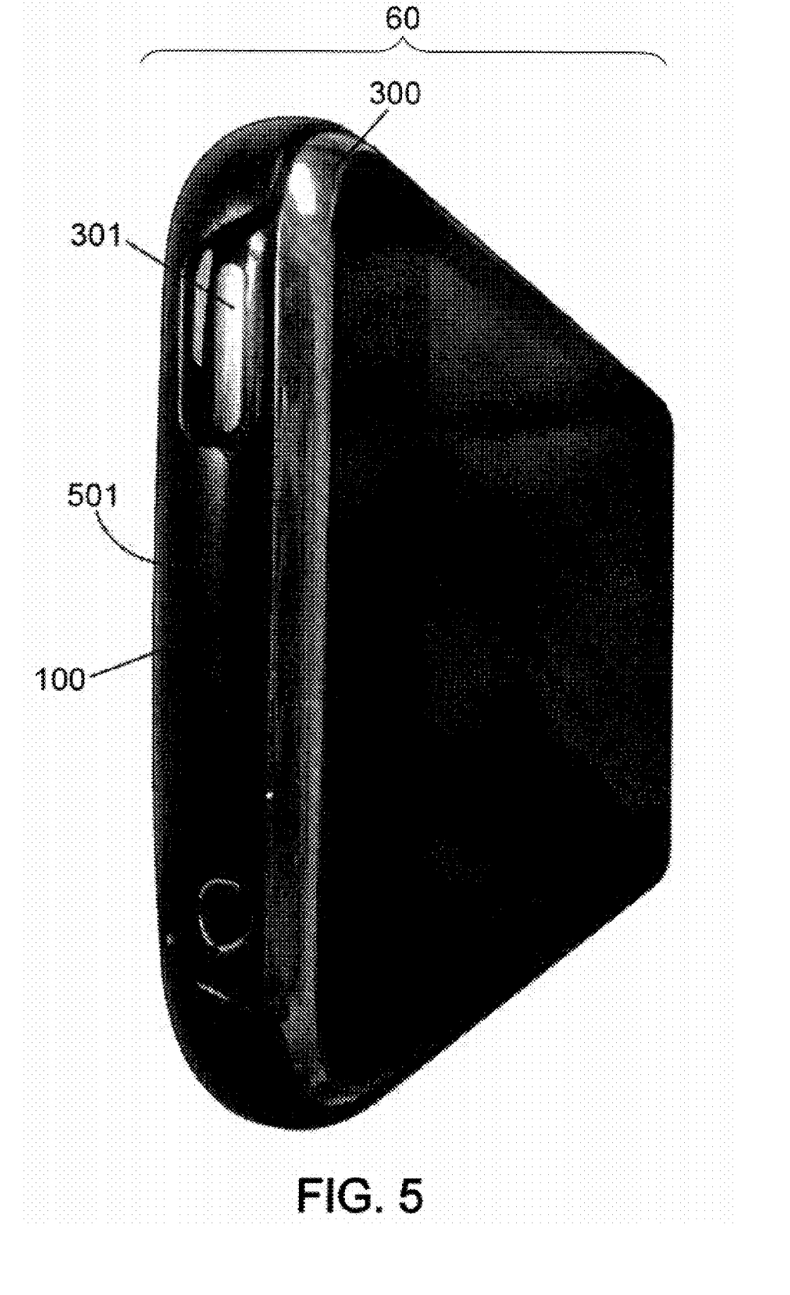
FIG. 5 illustrates a terminal according to an embodiment of the invention.

FIG. 5 illustrates a terminal according to an embodiment of the invention.

The terminal 60 comprises a mobile telephone 300 and a shell 100. An NFC adapting assembly as described above is positioned within the shell according to an embodiment of the invention. Advantageously in this embodiment, the shell can be arranged to have a curved edge 501 intended to cover the mobile telephone in the area where the wire-based interface passes between the interior and exterior of the telephone.

Figure 6:
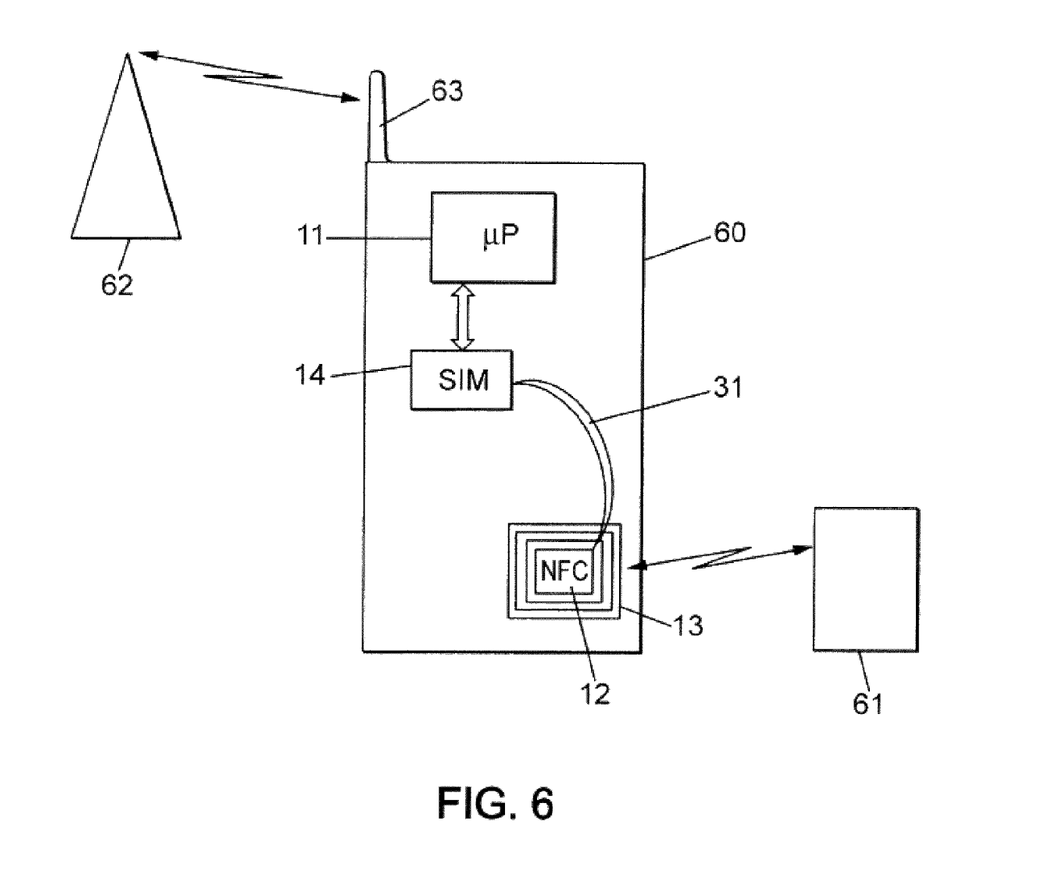
FIG. 6 illustrates a mobile telephony system according to an embodiment of the invention.

FIG. 6 illustrates a mobile telephony system according to an embodiment of the invention.

Such a system comprises a plurality of terminals 60, each one adapted for managing mobile telephony communications and for managing NFC communications, according to an embodiment of the invention.

For this purpose, the system comprises mobile telephony network equipment, such as base stations 62, with which the terminals 60 can communicate via an antenna 63 of the mobile telephone. It also comprises NFC equipment 61 for NFC applications with which the mobile telephones 60 can communicate via an antenna 13 associated with the NFC device. These two antenna 63 and 13 are respectively used in implementing the mobile telephony applications and NFC applications.

The invention claimed is:

1. A shell for a mobile telephone, said mobile telephone being able to comprise a subscriber identity card;
   said mobile telephone having a front face exhibiting a user interface, and a rear face; and the shell having an internal surface and an external surface;
   said shell having a shape adapted for removably receiving the mobile telephone so that the rear face of the mobile telephone is held along the internal surface of the shell;
   wherein the internal surface comprises:
      a first recess adapted for releasably holding a near-field communication device and an associated antenna; and
      a second recess adapted for guiding at least a portion of a wire-based interface intended to link the near-field communication device in the first recess to the subscriber identity card in a drawer of the mobile telephone; and
   wherein the shape presents a curved edge in the area where the wire-based interface is intended to enter inside the mobile telephone, wherein the second recess runs along the internal surface of the shape on the curved edge in said area along a path which enables one end of the wire-based interface to be connected to the subscriber identity card inside the mobile telephone and another end of the wire-based interface to be connected to the near-field communication device outside the mobile telephone in the first recess.

2. The shell for a mobile telephone according to claim 1, wherein the near-field communication device and the antenna are designed on a substrate; and
   wherein the first recess is a recess in the thickness of the shell on the internal surface, said first recess being of a size suitable for receiving said substrate and holding it in place by the act of being recessed.

3. The shell for a mobile telephone according to claim 2, wherein the first recess is of a thickness such that, when the substrate is in place in the first recess, the surface of the substrate receiving the near-field communication device is level with the internal surface of the shell.

4. The shell for a mobile telephone according to claim 1, wherein the first recess makes use of resin to hold the near-field communication device and its associated antenna in place.

5. The shell for a mobile telephone according to claim 1, wherein the wire-based interface corresponds to a plastic ribbon holding a plurality of wires within it and having a ribbon width and length; and
   wherein the second recess is a recess in the thickness of the shell on its internal surface, said second recess being of a size appropriate for receiving the width of the wire ribbon and at least a portion of the length of the wire ribbon.

6. The shell for a mobile telephone according to claim 5, wherein the second recess is of a depth such that, when the wire ribbon is in place in the recess, the wire ribbon is flush with the internal surface of the shell.

7. The shell for a mobile telephone according to claim 1, wherein the second recess is a flat-bottomed recess for a ribbon cable extending from the first recess to the curved edge.

8. A mobile terminal comprising: a mobile telephone having a subscriber identity card, a shell, a near-field communication device and an associated antenna, and a wire-based interface intended to link the near-field communication device to the subscriber identity card;
   said mobile telephone having a front face exhibiting a user interface, and a rear face; and the shell having an internal surface and an external surface;
   said shell having a shape adapted for removably receiving the mobile telephone so that the rear face of the mobile telephone is held along the internal surface of the shell;
   the internal surface comprising:
      a first recess adapted for releasably holding the near-field communication device and associated antenna; and
      a second recess adapted for guiding at least a portion of the wire-based interface intended to link the near-field communication device in the first recess to the subscriber identity card in a drawer of the mobile telephone; and
   wherein the shape presents a curved edge in the area where the wire-based interface enters inside the mobile telephone, wherein the second recess runs along the internal surface of the shape on the curved edge in said area along a path which enables one end of the wire-based interface to be connected to the subscriber identity card inside the mobile telephone and another end of the wire-based interface to be connected to the near-field communication device outside the mobile telephone in the first recess, the wire-based interface fitting into the second recess.

9. The mobile terminal according to claim 8,
wherein the near-field communication device and the antenna are designed on a substrate; and
wherein the first recess is a recess in the thickness of the shell on the internal surface, said first recess being of a size suitable for receiving said substrate and holding it in place by the act of being recessed.

10. The mobile terminal according to claim 9, wherein the first recess is of a thickness such that, when the substrate is in place in the first recess, the surface of the substrate receiving the near-field communication device is level with the internal surface of the shell.

11. The mobile terminal according to claim 8, wherein the wire-based interface corresponds to a plastic ribbon holding a plurality of wires within it and having a ribbon width and length; and
wherein the second recess is a recess in the thickness of the shell on its internal surface, said second recess being of a size appropriate for receiving the width of the wire ribbon and at least a portion of the length of the wire ribbon.

12. The mobile terminal according to claim 11, wherein the second recess is of a depth such that, when the wire ribbon is in place in the second recess, the wire ribbon is flush with the internal surface of the shell.

13. The mobile terminal according to claim 8, wherein the wire-based interface has a shape complementary to that of the second recess.

14. A mobile communication system comprising a plurality of mobile terminals according to claim 8.

* * * * *